(12) United States Patent
Torstensson (10) Patent No.: US 9,042,845 B2
(45) Date of Patent: May 26, 2015

(54) APPARATUS AND METHOD FOR DETECTING RADIO ACCESSORIES

(71) Applicant: MOTOROLA SOLUTIONS, INC., Schaumburg, IL (US)

(72) Inventor: Robert L. Torstensson, Rolling Meadows, IL (US)

(73) Assignee: Motorola Solutions, Inc., Schaumburg, IL (US)

( * ) Notice: Subject to any disclaimer, the term of this patent is extended or adjusted under 35 U.S.C. 154(b) by 230 days.

(21) Appl. No.: 13/691,329

(22) Filed: Nov. 30, 2012

(65) Prior Publication Data

US 2014/0155004 A1     Jun. 5, 2014

(51) Int. Cl.
*H04B 1/38*     (2006.01)
*H04B 1/40*     (2006.01)

(52) U.S. Cl.
CPC ........................................ *H04B 1/40* (2013.01)

(58) Field of Classification Search
CPC .................................................... H04M 1/6058
USPC ................. 455/90.2, 90.3, 550.1, 556.1, 557; 381/74, 111, 113–118
See application file for complete search history.

(56) References Cited

U.S. PATENT DOCUMENTS

| | | | |
|---|---|---|---|
| 7,130,184 B2 | 10/2006 | Choi | |
| 7,869,608 B2 * | 1/2011 | Sander et al. | 381/113 |
| 8,086,268 B2 | 12/2011 | Naganuma et al. | |
| 8,180,397 B2 * | 5/2012 | Stenmark et al. | 455/557 |
| 2011/0031808 A1 | 2/2011 | Hwang | |
| 2012/0051562 A1 | 3/2012 | Kim et al. | |

OTHER PUBLICATIONS

"DS2433 4Kb 1-Wire EEPROM from Dallas Semiconductor," Dallas Semiconductor Maxim, Retrieved from the Internet URL: http://ibutton.ru/pdf/Dallas_Sem/1-Wire/DS2433.pdf, on Dec. 22, 2014, pp. 1-21.

* cited by examiner

*Primary Examiner* — Tuan H Nguyen
(74) *Attorney, Agent, or Firm* — Barbara R. Doutre (57) ABSTRACT

An apparatus and method are provided for detecting radio accessories within a communication system formed of a radio, a primary accessory and a secondary accessory. The secondary accessory comprises a resistor network which switchably couples parallel resistors in response to a bias input generated from either a microphone bias voltage or speaker bias voltage of the primary accessory. Various parallel combinations of the resistors indicate the secondary accessory type. Control logic in the primary accessory determines the type of secondary accessory by comparing digital signals representative of the current sourced through the resistor network (175) to predetermined values stored in look-up table. The utilization of the microphone bias and/or speaker bias of the primary accessory advantageously negates the need for any additional pins or complex circuitry at the primary accessory.

12 Claims, 4 Drawing Sheets

APPARATUS AND METHOD FOR DETECTING RADIO ACCESSORIES

FIELD OF THE INVENTION

The present invention relates generally to communication devices and more particularly to detecting accessories operating in conjunction with a communication device.

BACKGROUND

As two-way radio communication devices continue to evolve, the use of accessories operating in conjunction with these devices has also expanded. The ability to operate numerous accessories with the communication device is considered desirable, particularly in the public safety communications environment. Examples of such accessories include, but are not limited to, remote speaker microphones, ear buds, audio adapters, and remote push-to-talk devices to name a few. Under typical operating conditions, one of the accessories is considered a primary accessory device and the other accessories are considered secondary accessory devices. However, the ability to detect one accessory type from another can be problematic.

Conventional approaches utilized in the detection of secondary accessories typically require additional circuitry on the primary accessory side which can increase parts count, pin count and circuit complexity. Additionally, idle condition requirements of the primary accessory can be in potential conflict with secondary audio circuitry operating requirements.

Accordingly, there is a need for an improved means for detecting a secondary radio accessory which minimizes impact to the primary accessory.

BRIEF DESCRIPTION OF THE FIGURES

The accompanying figures where like reference numerals refer to identical or functionally similar elements throughout the separate views and which together with the detailed description below are incorporated in and form part of the specification, serve to further illustrate various embodiments and to explain various principles and advantages all in accordance with the present invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail embodiments that are in accordance with the present invention, it should be observed that the embodiments reside primarily in apparatus components and method steps for detecting secondary radio accessory type within a communication system comprising a two-way radio and a primary accessory when the secondary accessory is being coupled thereto. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

Briefly, there is provided herein an apparatus and method for detecting radio accessories within a communication system. The communication system formed and operating in accordance with the various embodiments comprises a radio, a primary accessory and a secondary accessory. In accordance with the various embodiments, the secondary accessory comprises a resistor network which switchably couples parallel resistors in response to a bias input generated from either a microphone bias voltage or speaker bias voltage generated by the primary accessory. Various parallel combinations of the resistors indicate the secondary accessory type. Control logic in the primary accessory determines the type of secondary accessory by comparing the voltage levels produced by the resistor network to predetermined values stored in look-up table. The utilization of the microphone bias and/or speaker bias from the primary accessory advantageously re-uses bias lines for another function, that being accessory type identification. The apparatus and method provide a passive method for detecting multiple secondary radio accessory types.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

It will be appreciated that embodiments of the invention described herein may be comprised of one or more conventional processors and unique stored program instructions that control the one or more processors to implement, in conjunction with location sensing circuits and certain non-processor circuits, some, most, or all of the functions of a location sensing system and method of storing and sharing location information described herein. The non-processor circuits may include, but are not limited to, a radio receiver, a radio transmitter, signal drivers, clock circuits, power source circuits, and user input devices. As such, these functions may be interpreted as steps of a method to perform sharing of device location details. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

Figure 1:
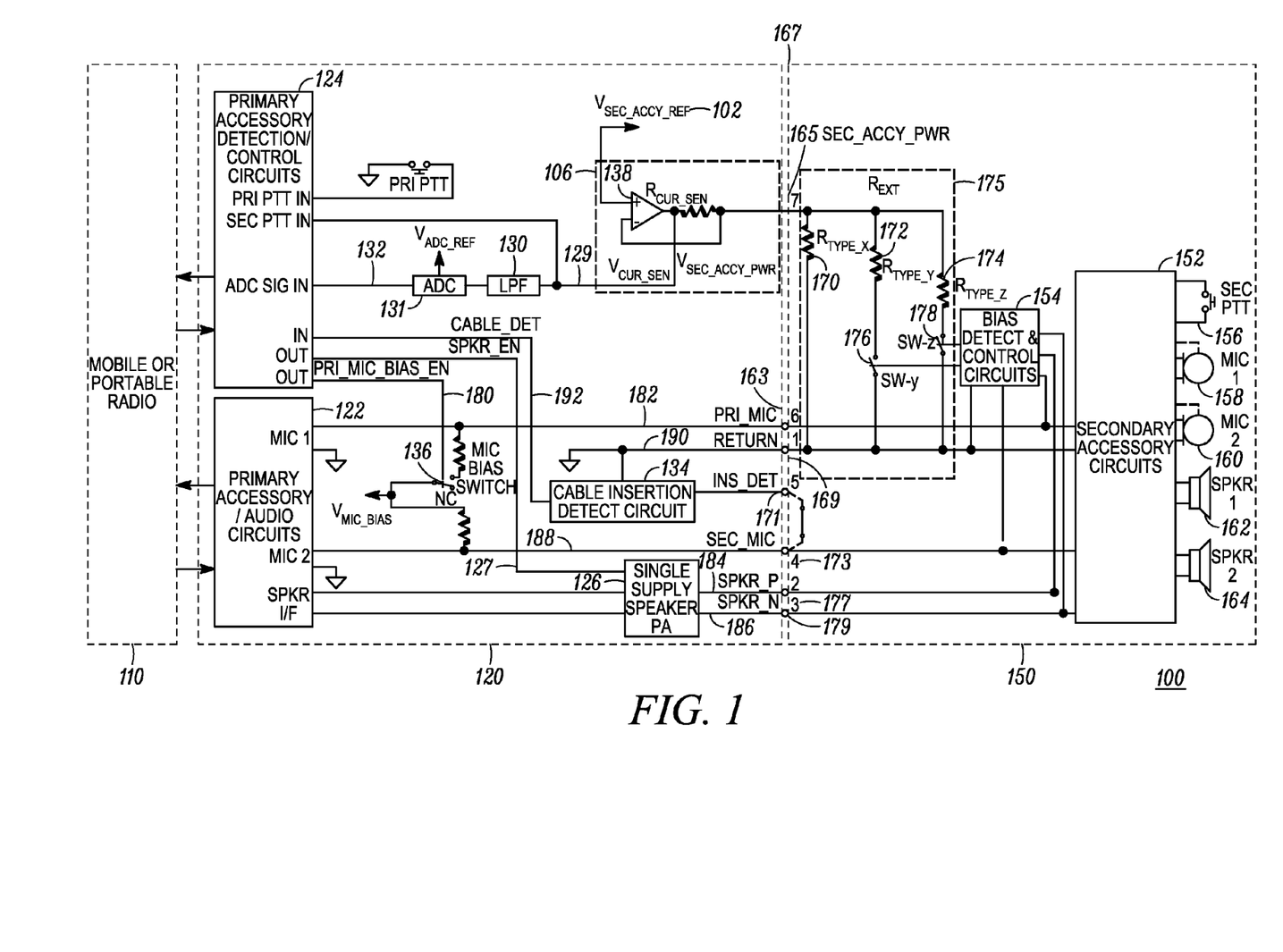
FIG. 1 is a schematic diagram of a communication system in accordance with the various embodiments.

FIG. 1 is a schematic diagram of a communication system 100, formed and operating in accordance with the various embodiments. Communication system 100 comprises a radio 110 (portable/handheld), a primary accessory 120, and a secondary accessory 150. For the purposes of this application a primary accessory is defined as an audio accessory that attaches to the radio via cable or wirelessly. Examples of a primary accessory include but are not limited to a remote speaker, a remote speaker microphone, a remote push-to-talk (PTT) device, to name a few. The secondary accessory is defined as an accessory that attaches to the primary accessory and provides further functionality to the primary accessory or radio, and/or provides remote functionality of the primary accessory. Examples of a secondary accessory include but are not limited to speaker microphones, ear buds, audio adapters, and remote push-to-talk devices, to name a few. In accordance with the various embodiments, the primary accessory 120 is able to detect a plurality of different types of secondary accessories without the use of additional pins through the advantageous utilization of the microphone bias and/or speaker bias from the primary accessory. An actual microphone transducer is not required for the primary accessory 120. For example, the primary accessory may comprises speaker drivers and microphone receivers, while the actual transducers may be located on the secondary accessory 150. Another example may be a microphone bias or speaker bias being used to control a secondary accessory 150 having a PTT switch (a PTT extension cable for example). Likewise speaker transducer need not be located in the primary accessory 120, but the bias is available for secondary accessories. A seven pin interface is utilized in accordance with the embodiments, and although pin numbering has been indicated, other pin numbering could be utilized.

Primary accessory 120 comprises primary accessory audio circuits 122 and primary accessory detection and control circuits 124. The secondary accessory 150 comprises a resistor network 175 and secondary accessory circuits 152 under control of a single bias detect control circuit 154. The number of resistors in resistor network 175 is dependent on the number of additional accessory types that can be accommodated within communication system 100. The secondary accessory 150 may comprise for example, an external push-to-talk (PTT) switch 156, microphones 158, 160, and/or speakers 162, 164. These secondary features are shown in FIG. 1 for illustrative purposes only and can be varied for different applications.

Upon attachment of the secondary accessory 150 to the primary accessory 120, shorting together of a detect input 171 and a secondary microphone output 173 (pins 5 and 4) occurs. The shorting is detected at a detect input 171 of cable insertion detect circuit 134, causing a cable detect line 192 to prompt the primary control circuit 124 to initiate the secondary accessory type detection process.

Secondary accessory type detection begins in the primary accessory 120 by sensing the resistance value ($R_{EXT}$) 175 at power contact 165 (shown as pin 7) relative to voltage return 169 (shown as pin 1) using a current to voltage converter 106. The $V_{SEC\_ACCY}$ at 165 is set to a constant value equal to $V_{SEC\_ACCY\_REF}$ using operational amplifier 138 in a voltage follower configuration. The output voltage 129 ($V_{CUR\_SEN}$), generated by current flowing through 129 ($R_{CUR\_SEN}$), of the current to voltage converter 106 is low pass filtered (LPF) 130 then digitized using an analog to digital converter (ADC) 131 to produce a digital signal 132. Primary control logic 124 in primary accessory 120 then takes the digitized signal 132 and uses a pre-defined look-up table to determine the type of secondary accessory 150 attached to the primary accessory 120. The primary accessory 120 can then adjust its hardware and/or software to operate correctly with features provided by the attached secondary accessory 150.

The resistor network ($R_{EXT}$) 175 will be described in terms of $R_{EXT1}$, $R_{EXT2}$, $R_{EXT3}$ (additional resistors can be added if the number of accessories warrants it). For each secondary accessory attachment, a plurality of accessory types, for example $R_{TYPE\_x}$, $R_{TYPE\_y}$, $R_{TYPE\_z}$ can be determined. For example, $R_{EXT1}$ is the resistance (produced by $R_{TYPE\_x}$) 170 seen at secondary accessory power (SEC_ACCY_PWR) contact 165 relative to voltage return 169. Each occurrence of a secondary accessory device being attached and removed impacts the resistive value of the resistor network 175. The primary accessory 120 may also communicate the secondary accessory type information to the radio 110 for any additional processing that may be needed to support the secondary accessory 150.

In accordance with the various embodiments, the number of secondary accessory types is controlled by using the ability to switch OFF and ON the primary microphone bias (insertion of $V_{MIC\_BIAS}$ via switch 136 MIC BIAS SWITCH) applied to primary microphone 163 (PRI_MIC) and/or the primary speaker bias, generated within speaker PA 126, applied to SPKR_P/SPKR_N (177/179). In accordance with the various embodiments, the speaker PA 126 is powered from a single supply. A speaker enable (SPKR_EN) 127 is used to turn ON and OFF the speaker PA 126 which in turn applies primary speaker bias to SPKR_P/SPKR_N (177/179).

Table 1 provides acronyms and abbreviations to facilitate the review of FIG. 1.

TABLE 1

| | |
|---|---|
| NC—normally closed | ADC—analog to digital converter |
| PA—power amplifier | EN—enable |
| MIC—microphone | EXT—external |
| SPKR—speaker | PTT—push-to-talk |
| PRI—primary | CUR—current |
| SEC—secondary | SEN—sense |
| INS—insertion | PWR—power |
| DET—detect | REF—reference |
| ACCY—Accessory | SW—switch |
| LPF—low pass filter | SIG—signal |
| I/F—interface | |

Accessory Type Detection

Three steps are used to determine the type of secondary accessory attached to the primary accessory 120. The resistor network 175, in this embodiment, comprises a first resistor (RTYPE_x) 170 switchably coupled in parallel with second resistor (RTYPE_y) 172 via switch 176 (SW-y) and third resistor (RTYPE_z) 174 via switch 178 (SW-z). Note, switches 176 (SW-y) and 178 (SW-y) can be any electronic switch such as a transistor. This arrangement accommodates for three levels of sensing as shown in Table 2a. Table 2b shows a 4-level where all four ON/OFF combinations of microphone bias and speaker bias is used. Depending on the desired application, 1-level and 2-level versions are also possible if one or both bias voltages are not used for a simpler secondary accessory circuit design, which are subsets of the 3-level and 4-level versions.

TABLE 2a

3-Level Version $1 \le b \le N$
$1 \le c \le M$
$1 \le d \le P$

TABLE 2b

4-Level Version $1 \leq b \leq N$
$1 \leq c \leq M$
$1 \leq d \leq P$
$1 \leq e \leq K$ Each of the three levels covers multiple sub bands. In Table 2a, three detection levels, N, M and P, are represented. Each level (N, M, P) represents a code range for each sampled input of digital signal 132 from the ADC 131.

Table 3a presents an example of three levels of detection with three sub-bands (N=3, M=3, P=3) in each level. This example allows for twenty seven secondary accessory types to be detected. It also shows only seven code levels are required when one reuses REXT resistance values. To achieve this, the following is required:

R1>R2>R3>R4>R5>R6>R7

Parallel combinations of $R_{TYPE\_x}$, $R_{TYPE\_y}$, and $R_{TYPE\_z}$ produce successive lower value resistances.

Table 3b presents an example of four levels of detection that also allows for the same twenty seven secondary accessory types to be detected. However, N is set to 6 bands where bands 4-6 do not get split into sub bands (type detection stops at level N when resistance R4, R5 and R6 are detected without enabling either bias voltage). For illustrative purposes M=2, P=2 and K=2 to achieve the same twenty seven secondary accessory types with one fewer code value. To achieve this the following is required:

R1>R2>R3>R4>R5>R6

Parallel combinations of RTYPE_x, RTYPE_y and RTYPE_z produce successive lower value resistances.

Variations of N, M, P and K control the number of secondary accessories possible. Circuits component tolerances and desired complexity also play a role in setting the number of secondary accessories possible.

TABLE 3a

3-Level Example
N = 3 (1 ≤ b ≤ 3), M = 3 (1 ≤ c ≤ 3), P = 3 (1 ≤ d ≤ 3)
(27 Secondary Accessory Types)

| Bias State | | | | |
|---|---|---|---|---|
| A = OFF | A = ON | A = ON | | |
| B = OFF | B = OFF | B = ON | | |
| Secondary Resistance Value | | | | Secondary |
| REXT1 (Level N) | REXT2 (Level M) | REXT3 (Level P) | Code Value | Accessory Type # |
| R1 (b = 1) | R1 (c = 1) | R1 (d = 1) | Code 1 | 1 |
|  |  | R2 (d = 2) | Code 2 | 2 |
|  |  | R3 (d = 3) | Code 3 | 3 |
|  | R2 (c = 2) | R2 (d = 1) | Code 2 | 4 |
|  |  | R3 (d = 2) | Code 3 | 5 |
|  |  | R4 (d = 3) | Code 4 | 6 |
|  | R3 (c = 3) | R3 (d = 1) | Code 3 | 7 |
|  |  | R4 (d = 2) | Code 4 | 8 |
|  |  | R5 (d = 3) | Code 5 | 9 |
| R2 (b = 2) | R2 (c = 1) | R2 (d = 1) | Code 2 | 10 |
|  |  | R3 (d = 2) | Code 3 | 11 |
|  |  | R4 (d = 3) | Code 4 | 12 |
|  | R3 (c = 2) | R3 (d = 1) | Code 3 | 13 |
|  |  | R4 (d = 2) | Code 4 | 14 |
|  |  | R5 (d = 3) | Code 5 | 15 |
|  | R4 (c = 3) | R4 (d = 1) | Code 4 | 16 |
|  |  | R5 (d = 2) | Code 5 | 17 |
|  |  | R6 (d = 3) | Code 6 | 18 |

TABLE 3a-continued

3-Level Example
N = 3 (1 ≤ b ≤ 3), M = 3 (1 ≤ c ≤ 3), P = 3 (1 ≤ d ≤ 3)
(27 Secondary Accessory Types)

| Bias State | | | | |
|---|---|---|---|---|
| A = OFF | A = ON | A = ON | | |
| B = OFF | B = OFF | B = ON | | |
| Secondary Resistance Value | | | | Secondary |
| REXT1 (Level N) | REXT2 (Level M) | REXT3 (Level P) | Code Value | Accessory Type # |
| R3 (b = 3) | R3 (c = 1) | R3 (d = 1) | Code 3 | 19 |
|  |  | R4 (d = 2) | Code 4 | 20 |
|  |  | R5 (d = 3) | Code 5 | 21 |
|  | R4 (c = 2) | R4 (d = 1) | Code 4 | 22 |
|  |  | R5 (d = 2) | Code 5 | 23 |
|  |  | R6 (d = 3) | Code 6 | 24 |
|  | R5 (c = 3) | R5 (d = 1) | Code 5 | 25 |
|  |  | R6 (d = 2) | Code 6 | 26 |
|  |  | R7 (d = 3) | Code 7 | 27 |

TABLE 3b

4-Level Example
N = 6 (1 ≤ b ≤ 6), M = 2 (1 ≤ c ≤ 2),
P = 2 (1 ≤ d ≤ 2), K = 2 (1 ≤ e ≤ 2)
(27 Secondary Accessory Types)

| Bias State | | | | | |
|---|---|---|---|---|---|
| A = OFF | A = ON | A = ON | A = OFF | | |
| B = OFF | B = OFF | B = ON | B = ON | | |
| Secondary Resistance Value | | | | | Secondary |
| REXT1 (Level N) | REXT2 (Level M) | REXT3 (Level P) | REXT4 (Level K) | Code Value | Accessory Type # |
| R1 (b = 1) | R1 (c = 1) | R1 (d = 1) | R1 (e = 1) | Code 1 | 1 |
|  |  |  | R2 (e = 2) | Code 2 | 2 |
|  |  | R2 (d = 2) | R2 (e = 1) | Code 2 | 3 |
|  |  |  | R3 (e = 2) | Code 3 | 4 |
|  | R2 (c = 2) | R2 (d = 1) | R2 (e = 1) | Code 2 | 5 |
|  |  |  | R3 (e = 2) | Code 3 | 6 |
|  |  | R3 (d = 2) | R3 (e = 1) | Code 3 | 7 |
|  |  |  | R4 (e = 2) | Code 4 | 8 |
| R2 (b = 2) | R2 (c = 1) | R2 (d = 1) | R2 (e = 1) | Code 2 | 9 |
|  |  |  | R3 (e = 2) | Code 3 | 10 |
|  |  | R3 (d = 2) | R3 (e = 1) | Code 3 | 11 |
|  |  |  | R4 (e = 2) | Code 4 | 12 |
|  | R3 (c = 2) | R3 (d = 1) | R3 (e = 1) | Code 3 | 13 |
|  |  |  | R4 (e = 2) | Code 4 | 14 |
|  |  | R4 (d = 2) | R4 (e = 1) | Code 4 | 15 |
|  |  |  | R5 (e = 2) | Code 5 | 16 |
| R3 (b = 3) | R3 (c = 1) | R3 (d = 1) | R3 (e = 1) | Code 3 | 17 |
|  |  |  | R4 (e = 2) | Code 4 | 18 |
|  |  | R4 (d = 2) | R4 (e = 1) | Code 4 | 19 |
|  |  |  | R5 (e = 2) | Code 5 | 20 |
|  | R4 (c = 2) | R4 (d = 1) | R4 (e = 1) | Code 4 | 21 |
|  |  |  | R5 (e = 2) | Code 5 | 22 |
|  |  | R5 (d = 2) | R5 (e = 1) | Code 5 | 23 |
|  |  |  | R6 (e = 2) | Code 6 | 24 |
| R4 (b = 4) |  |  |  | Code 4 | 25 |
| R5 (b = 5) |  |  |  | Code 5 | 26 |
| R6 (b = 6) |  |  |  | Code 6 | 27 |

In operation, upon powering up the primary accessory 120, the primary mic bias switch 136 and the speaker PA 126 are initially turned off. As such, the bias detect and control circuits 154 leave switches 176, 178 open. The primary accessory 120 samples and averages the digital signal 132 from the ADC 131 to determine if it falls within a range from 0≤X≤N, also referred to as level N sub bands, by sensing the resistor network 175 as $R_{EXT1}$. Sensing the resistor network encompasses measuring the current being sourced at 165, converting the current to a voltage signal 129 via current to voltage converter 106, filtering the voltage signal 129 through low pass filter 130 and digitizing the filtered signal into digital signal 132 for comparison within a look up table of primary control circuit 124.

Once the N level sub bands sensing has been completed, then the primary accessory 120 performs level M sub bands sensing, by turning on primary mic bias switch 136 which applies microphone bias to PRI_MIC 163. The bias detect and control circuits 154 of secondary accessory 150, in response to primary microphone bias present on 182, closes switch 176. The primary accessory 120 then senses the resistance of resistive network 175, in the manner previously described, and then samples and averages the digital signal 132 produced with the two parallel resistors switched in as, $R_{EXT2}$=resistor 170 ($R_{TYPE\_x}$) in parallel with resistor 172 ($R_{TYPE\_y}$). The sampled value is compared to a value range $1 \leq Y \leq M$ stored within the look-up table of primary control circuits 124.

Once the level M sub bands sensing has been completed, then the primary accessory 120 turns on the speaker PA 126 which applies speaker bias to SPKR_P/SPKR_N (177/179) while the primary microphone bias (inserted at mic bias switch 136) remains on. The bias detect and control circuits 154, in response to speaker bias 177, 179 closes switch 178. The primary accessory 120 then senses the resistance of resistive network 175, in the manner previously described, and samples and averages the digital signal 132 under the conditions of three parallel resistors, $R_{EXT3}$=resistor 170 ($R_{TYPE\_x}$) in parallel with resistor 172 ($R_{TYPE\_y}$) in parallel with resistor 174 ($R_{TYPE\_z}$). The sampled value is compared to a preprogrammed range $1 \leq Z \leq P$ stored within the look-up table of primary control circuits 124.

In accordance with the various embodiments, the number of accessory types that can be covered by the communication system 100 is flexible, depending on the tolerances of the resistors and the accuracy of the ADC 131. All three steps may be used to provide for the ability to detect more secondary accessory types. If the communication system 100 need only recognize fewer types of secondary accessories and simplify secondary accessory circuits, then only the first and or two sensing steps are utilized.

Unlike circuits which use external memory ICs, etc, this apparatus and method for detecting radio accessories provided by the various embodiments utilizes a resistor on a separate power line (SEC_ACCY_PWR) 165 for current level detection. This advantageously results in the microphone bias and/or speaker bias being turned ON, which enables the detection of different resistances for different accessory attachments. Additionally, a non-standard 6-pole, 2.5 mm plug may be utilized as the interface 167, as opposed to a standard 3.5 mm plug. The circuitry used for secondary accessory detection utilizes minimal current (<1 mAdc) thereby providing improved battery life in the device supplying power to the attachment.

The accessory detection operating in accordance with the various embodiments minimizes the use of complicated designs by eliminating the need for any external FLASH memory for detecting types of attachments. Hence, the system is particularly beneficial for portable, handheld/body worn communication systems that need to conserve power.

Figure 2A:
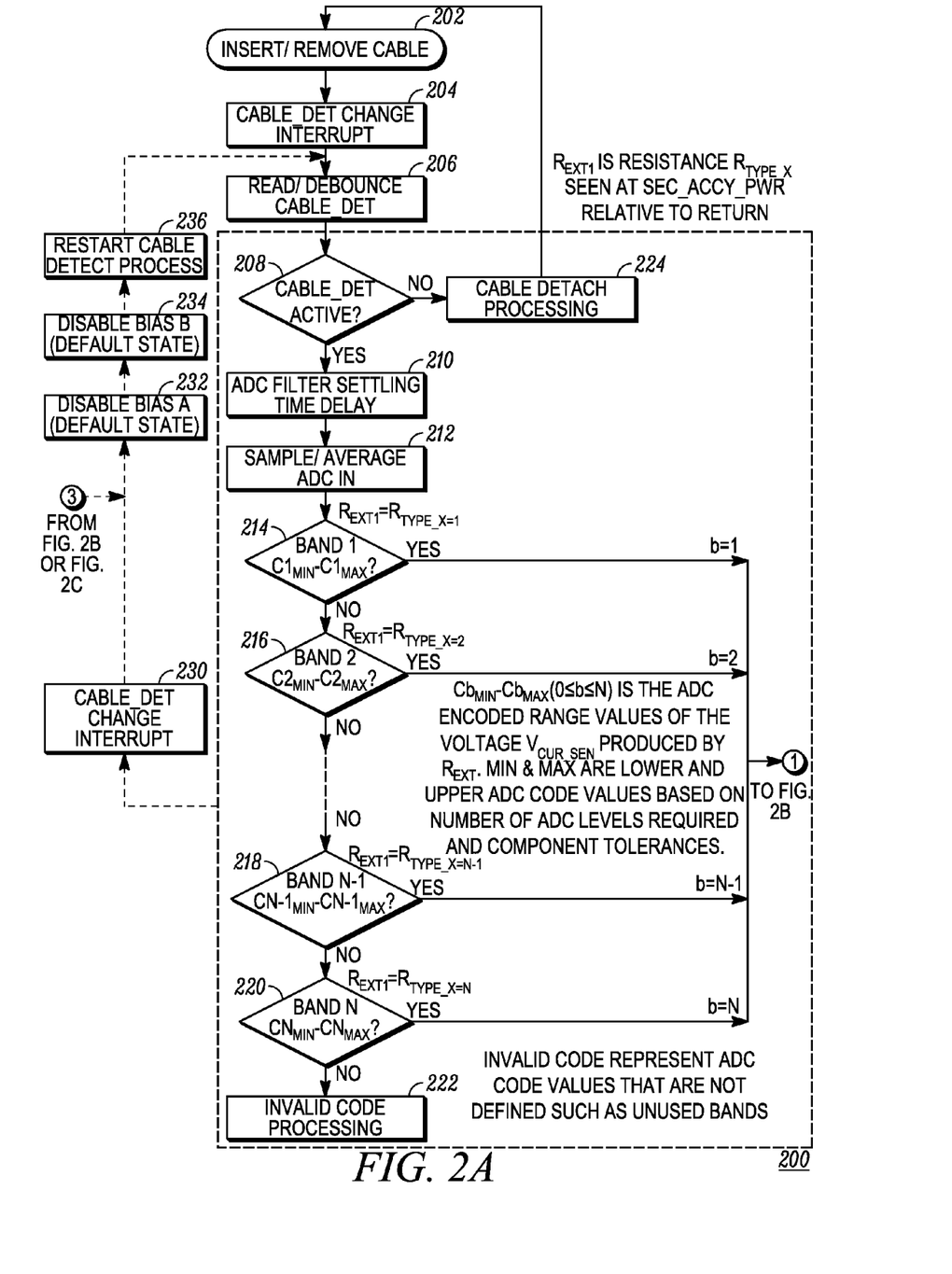
FIGS. 2A, 2B, 2C provide a flowchart of a method for providing three levels of accessory detection in accordance with the various embodiments.
Figure 2B:
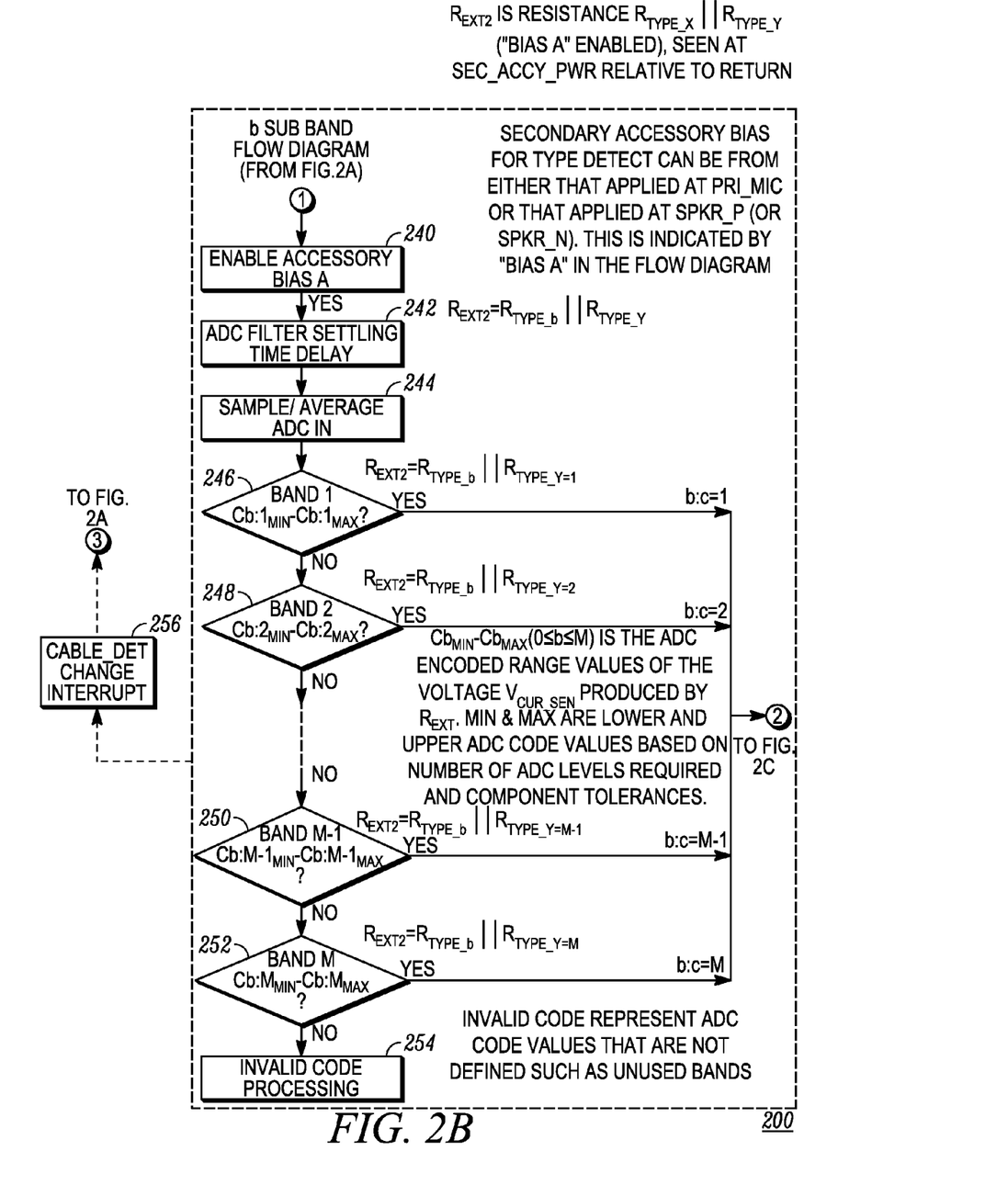
Figure 2C:
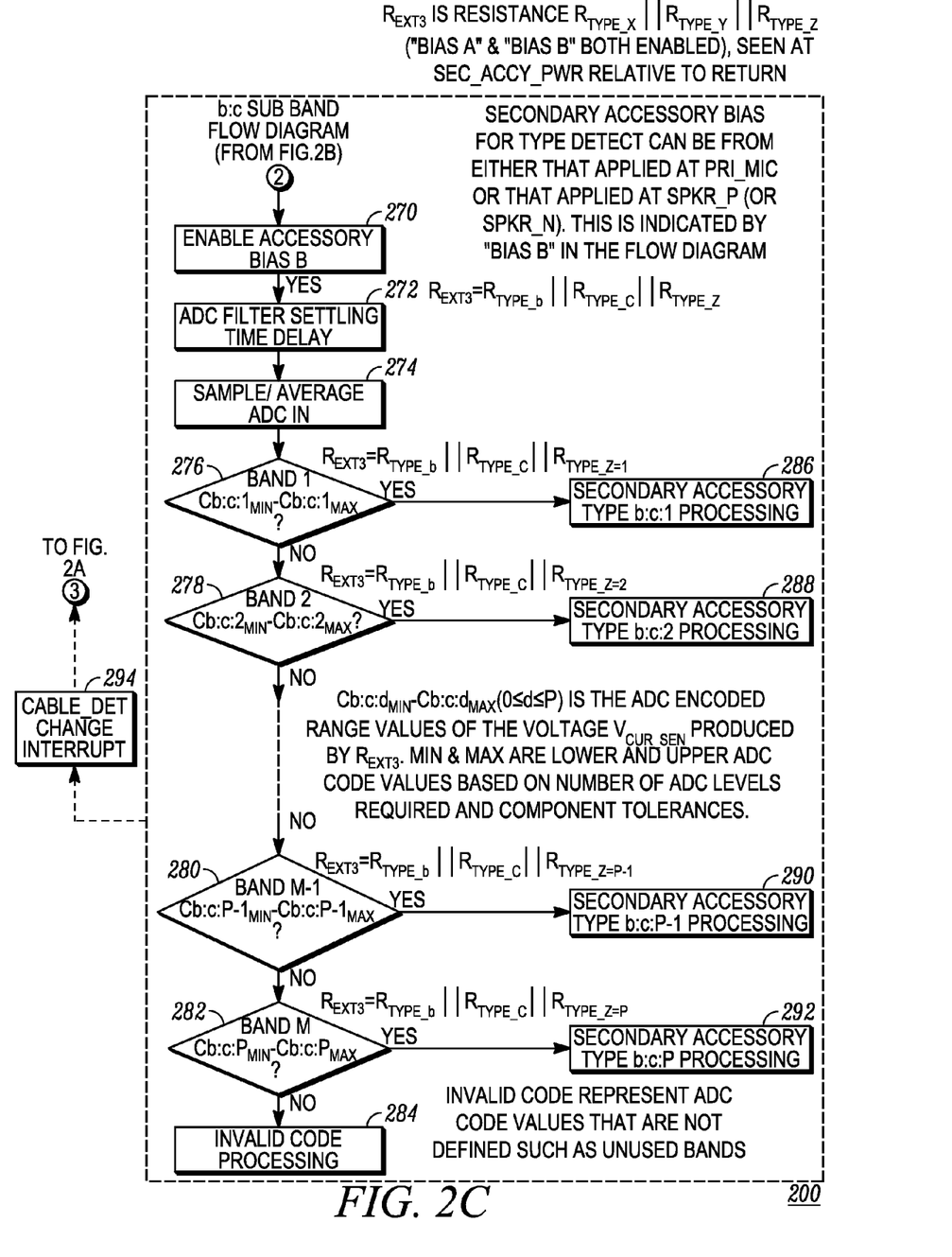

FIGS. 2A, 2B, 2C provide a flowchart of a method 200 for multiple levels of accessory detection for accessories being coupled to a primary accessory of a radio in accordance with the various embodiments. Designator numerals in parentheses are provided to refer back to FIG. 1. Detection of accessory type utilizes a bias applied at 163 (PRI_MIC) or bias applied at 177, 179 (SPKR_P, SPKR_N). Enabling application of secondary accessory bias (Bias A, BIAS B, and BIAS A with BIAS B) for type detection at each resistor is dependent on accessory types covered by that band. For purposes of the flowchart BIAS A will be the microphone bias applied at 163 (PRI_MIC) and the BIAS B will be the speaker bias applied at 177, 179 (SPKR_P, SPKR_N). However, these could be swapped.

Beginning at 202, by inserting or attaching a cable of a secondary accessory (150) to the primary accessory (120), a cable detect interrupt of the primary accessory is detected at 204. The cable detect line (171) is checked for bounce at 206 and if, at 208, cable detect is inactive, then cable detach processing occurs at 224 and the method returns to 202.

If activity is detected on the cable detect input line at 208, then current sourced at the secondary accessory power contact (165) is converted to voltage, such as through current to voltage converter (106). The voltage signal is filtered, through low pass filter (130), and digitized through ADC (131), at 210. The digitized signal (132) is then sampled and averaged at 212, such as through primary control circuits (124), to generate an average sampled value.

The average sampled value from 212 is compared against a first band (band 1) at 214 where the resistor network (175) presents a single resistor, $R_{EXT1}=R_{Type_{13}\_x=1}$. The ranges within each band (Band 1 through Band N) are pre-stored in a look-up table within control circuits (124) for each accessory type. Thus, $C_{bMIN}-C_{bMAX}$ ($1 \leq b \leq N$) is the ADC encoded range values of the voltage $V_{CUR-SEN}$ produced by $R_{ENT}$. The MIN and MAX are lower and upper ADC code values based on number of ADC levels required and component tolerances.

If the average ADC level falls (132) within the first band, then b=1 and the method proceeds to FIB. 2B.

If the average ADC level does not fall within the first band at 214, then the average ADC level is compared against a second band (band 2) at 216 where the resistor network (175) is now $R_{EXT1}=R_{Type\_x=2}$.

If the average ADC level falls within the second band, then b=2 and the method proceeds to FIB. 2B.

If the average ADC level does not fall within the second band at 216, the method proceeds through the subsequent bands.

The method continues as above, until the average ADC level is compared against band N−1 at 218 where the resistor network (175) presents $R_{EXT1}=R_{Type\_x=N-1}$.

If the average ADC level at 218 falls within the N−1 band, then b=N−1 and the method proceeds to FIB. 2B.

The method continues until all the average ADC level has been compared though band N at 220 where the resistor network (175) presents $R_{EXT1}=R_{Type\_x=N}$. If the average ADC level does not fall within any band within band 1 through band N, then invalid code processing is determined at 222. Invalid Code represents ADC code values that are not defined, such as unused bands.

Throughout the method of FIG. 2A cable interrupt detection is available at 230 as well as bias disable A (for FIG. 2B) at 232 and bias disable B (for FIG. 2C) at 234 to restart the cable detect process at 236.

The method continues at FIG. 2B, where accessory BIAS A is enabled at 240. Enabling BIAS A at 240 results in the resistor network ($R_{EXT}$) 175 being $R_{ext\_2}=R_{TYPE\_b}$ in parallel with $R_{TYPE\_y}$.

The current sourced $R_{EXT2}$ is converted to a voltage, by current to voltage converter (106), filtered through low pass filter (130), and digitized through the ADC (131) at 242 to produce a digital signal (132) which is sampled and averaged at 244 within the primary control circuit (124).

The average sampled value from 244 is compared to a first band (band 1) at 246 where $R_{ext\_2}=R_{TYPE\_b}$ in parallel with $R_{TYPE\_y=1}$. The ranges within each band (Band 1 through Band M) are pre-stored in the look-up table within control circuits (124) for each accessory type. The band ranges are set as Cb:cMIN–Cb:cMAX (0≤c≤M) is the ADC encoded range values of the voltage $V_{CUR\_SEN}$ produced by $R_{EXT}$. The MIN and MAX are lower and upper ADC code values based on number of ADC levels required and component tolerances.

If the average level falls within the first band at 246, then b:c=1 and the method proceeds to FIB. 2C.

If the average ADC level does not fall within the first band at 246, then the average ADC level is compared against a second band (band 2) at 248 where the resistor network (175) is now $R_{EXT2}=R_{Type\_b}$ in parallel with $R_{Type\;y=2}$.

If the average ADC level falls within the second band at 248, then b:c=2 and the method proceeds to FIB. 2C.

If the average ADC level does not fall within the second band at 248, the method proceeds through the subsequent bands.

The method continues as above, until the average ADC level is compared against band M−1 at 250 where the resistor network (175) presents $R_{EXT2}=R_{Type\_b}$ in parallel with $R_{Type\_y=M-1}$.

If the average ADC level at 250 falls within the M−1 band, then b:c=M−1 and the method proceeds to FIB. 2C.

The method continues until all the average ADC level has been compared though band N at 252 where the resistor network (175) presents $R_{EXT2}=R_{Type\;b}$ in parallel with $R_{Type\_y=M}$. If the average ADC level does not fall within any band within band 1 through band M, then invalid code processing is determined at 254. Invalid code represents ADC code values that are not defined, such as unused bands.

Additionally, a cable detect interrupt at 256 will disable BIAS A at 232 (see FIG. 2A) and restart the cable detect process at 236.

The method continues at FIG. 2C where accessory BIAS B is enabled at 270. Enabling BIAS B at 270 results in the resistor network ($R_{EXT}$) 175 being $R_{ext\_3}=R_{TYPE\_b}$ in parallel $R_{TYPE\_c}$ in parallel $R_{TYPE\_z}$.

The current sourced $R_{EXT3}$ is converted to a voltage, by current to voltage converter (106), filtered through low pass filter (130), and digitized through the ADC (131) at 272 to produce a digital signal (132) which is sampled and averaged at 274 within the primary control circuit (124).

The average ADC level at 274, where $R_{ext\_3}=R_{TYPE\_b}$ in parallel with $R_{TYPE\_c}$ in parallel with $R_{TYPE\_z=1}$, is compared to a first band at 276. The band ranges are set as Cb:c:dMIN-Cb:c:dMAX (0≤d≤P) is the ADC encoded range values of the voltage $V_{CUR\_SEN}$ produced by $R_{EXT3}$. The MIN and MAX are lower and upper ADC code values based on number of ADC levels required and component tolerances.

If the average ADC level falls within the first band at 276, then secondary accessory type b:c:1 is detected and processed at 286.

If the average ADC value does not fall within the first band at 276, then the average ADC level is compared against a second band (band2) at 278 where the resistor network (175) is now $R_{EXT3}=R_{Type\_b}$ in parallel with $R_{Type\_c}$ in parallel with $R_{Type\;z=2}$.

If the average ADC level falls within the second band 278, then secondary accessory type b:c:2 is detected and processed at 288.

If the average ADC level at 274 does not fall within the second band at 278, the method continues to compare the average ADC level to band P−1 at 280 where the resistor network (175) is now $R_{EXT3}=R_{Type\_b}$ in parallel with $R_{Type\_c}$ in parallel with $R_{Type\;z=p-1}$.

If the average ADC level falls within the P−1 band 280, then secondary accessory type b:c:P−1 is detected and processed at 290.

If the average value at 274 does not fall within the P−1 band at 280, then the average ADC level is compared to band P at 282 where the resistor network (175) is now $R_{EXT3}=R_{Type\_b}$ in parallel with $R_{Type\_c}$ in parallel with $R_{Type\;z=p}$.

If the average ADC level falls within the P band at 282, then secondary accessory type b:c:P is detected and processed at 292.

If the average level does not fall within the last band P at 282, then invalid code processing is determined at 284. Invalid code represents ADC code values that are not defined such as unused bands.

Additionally, a cable detect interrupt at 294 will disable BIAS A 232 and BIAS B at 234 (see FIG. 2A) and restart the cable detect process at 236.

While three levels of accessory detection have been provided by the method steps of FIGS. 2A, 2B, 2C, the apparatus and method can accommodate two levels of accessory detection by implementing only steps of FIGS. 2A and 2B, and can accommodate single level accessory detection implementing only the steps of FIG. 2A. The incorporation of the resistor network (175) allows for many different types of accessory to be identified, and the ability to use the microphone bias and/or speaker bias allows the resistor network to be incorporated without additional contact pins.

Again, inserting resistances by turning microphone bias ON and/or speaker bias ON based on the type of attachment allows for improved battery life and smaller interface plugs to be used, thereby reducing size and cost while improving battery life. The apparatus and method operating in accordance with the various embodiments provide a passive method for detecting multiple secondary radio accessory types.

The apparatus and method for detecting accessories in accordance with the various embodiments minimizes any conflict to the primary accessory during idle operating conditions. The apparatus and method are extremely advantageous to portable/handheld radio accessories where current drain must be minimized and space constraints are often limited.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

I claim:

1. A communication system, comprising:
   a radio;
   a primary accessory coupled to the radio; and
   a secondary accessory attached to the primary accessory, the secondary comprising a resistor network for switchably coupling parallel resistors into parallel combinations of resistors in response to a bias input generated from either a microphone bias voltage or speaker bias voltage of the primary accessory, the parallel combinations of resistors within the resistor network indicating the secondary accessory type; and wherein the primary accessory comprises:
a current to voltage converter for generating an analog voltage representative of the current being sourced to the resistor network of the secondary accessory;
an analog-to-digital converter for generating a digitized signal of the analog voltage;
control logic for sampling and averaging the digitized signal and determining the secondary accessory type based on the sampled and averaged digitized signal;
a detect circuit for detecting the coupling of the secondary accessory to the primary accessory and providing a detect signal to the control logic to enable power up of the secondary accessory; and
wherein the secondary accessory comprises:
bias detect and control circuitry for receiving the bias input to control the switchably coupled resistors of the resistor network; and
wherein the resistor network of the secondary accessory comprises:
a first resistor coupled between an output of the current to voltage converter and a return line of the detect circuit; and
a second resistor switchably coupled in parallel to the first resistor; and
a third resistor switchably coupled in parallel to the second resistor, the first second and third resistors.

2. The communication system of claim 1, wherein the secondary accessory further comprises a bias detect control circuit responsive to the bias input from the primary accessory for controlling switching of the parallel resistors of the resistor network.

3. The communication system of claim 1, wherein the primary accessory comprises control logic that determines the secondary accessory type by comparing digital codes produced by the resistor network to predetermined values stored in look-up table.

4. The communication system of claim 3, wherein the control logic of the primary accessory receives a sampled digital signal representative of current used to source the resistor network of the secondary accessory to identify the secondary accessory type.

5. The communication system of claim 1, wherein the primary accessory comprises a single supply speaker power amplifier, and the bias input to the secondary accessory is generated from a speaker bias of the single supply speaker power amplifier.

6. The communication system of claim 1, wherein three levels of secondary accessory types are identifiable, each level being determined by three resistors, each resistor being enabled so that network resistance can be sensed and compared to a plurality of bands and a plurality of sub-bands.

7. The communication system of claim 1, wherein the primary accessory communicates the secondary accessory type to the radio for additional processing to support the secondary accessory.

8. A method for detecting a secondary accessory to a primary accessory, comprising:
detecting attachment of the secondary accessory to the primary accessory;
powering up the secondary accessory through a resistor network;
sensing the resistance of the resistor network;
comparing the sensed resistance to a first band of resistance values stored in a look up table of the primary accessory;
turning on a first bias input, the first bias input being at least one of microphone bias and/or a speaker bias;
switching in a resistor within the resistor network in response to the first bias input;
determining a second band of operation for the resistor network;
turning on a second bias input so that both the microphone bias and speaker bias are turned on;
switching in another resistor within the resistor network in response to the first and second bias input;
sensing the resistance of the resistor network with the microphone bias and speaker bias being turned on; and
determining accessory type based on resistance sensed with both the first and second bias inputs turned on; and
operating the secondary accessory in accordance with processing parameters associated with the determined accessory type.

9. The method of claim 8, wherein sensing the resistance comprises:
detecting current through the resistor network in the secondary accessory;
converting the detected current to a voltage that is applied to an analog-to-digital converter to generate a digital signal; and
sampling and averaging the digital signal;
comparing the average digital signal to a plurality of pre-stored values in the look up table;

10. The method of claim 8, wherein the bias input is provided by:
enabling a microphone bias line;
enabling speaker bias lines while the microphone bias line is still enabled.

11. The method of claim 8, wherein a single supply speaker power amplifier generates the speaker bias used for switchably coupling resistors in parallel within the resistor network.

12. A communication system, comprising:
a radio;
a primary accessory coupled to the radio, the primary accessory having an interface for accepting a secondary accessory, wherein the secondary accessory can be one of a plurality of different types of secondary accessories;
the primary accessory comprising:
a voltage reference;
a current to voltage converter for receiving the voltage reference, the current to voltage converter generating a voltage power output for the secondary accessory;
an analog to digital converter (ADC) for converting the voltage power output to a digital signal;
a control circuit for sampling and averaging the digital signal into an average ADC signal and comparing the average ADC signal to values stored in a look-up table;
a bias signal comprising a microphone bias and/or a speaker bias being generated by the primary accessory;
the secondary accessory comprising:
a resistor network having plurality of switchably coupled parallel resistors powered by the voltage power output of the primary accessory and controlled by the bias input of the primary accessory, wherein current sourced through the resistor network is converted to the digital signal in the primary accessory to determine accessory type within the look-up table.

\* \* \* \* \*